(12) United States Patent
Kalliojärvi (10) Patent No.: US 6,580,920 B2
(45) Date of Patent: Jun. 17, 2003

(54) SYSTEM FOR ADJUSTING GAIN OF A MOBILE STATION DURING AN IDLE PERIOD OF THE SERVING BASE STATION

(75) Inventor: Kari Kalliojärvi, Kangasala (FI)

(73) Assignee: Nokia Mobile Phones Ltd., Espoo (FI)

( * ) Notice: Subject to any disclaimer, the term of this patent is extended or adjusted under 35 U.S.C. 154(b) by 14 days.

(21) Appl. No.: 09/874,912

(22) Filed: Jun. 5, 2001

(65) Prior Publication Data

US 2003/0017837 A1 Jan. 23, 2003

(51) Int. Cl.[7] .................................................. H04B 7/00
(52) U.S. Cl. ........................ 455/522; 455/67.3; 455/69
(58) Field of Search ................................ 455/522, 524, 455/525, 67.1, 67.3, 134, 135, 136, 69

(56) References Cited

U.S. PATENT DOCUMENTS

| 6,049,535 A | * | 4/2000 | Ozukturk et al. | ............ 455/522 |
| 6,151,354 A | * | 11/2000 | Abbey | ........................ 455/132 |
| 6,212,174 B1 | * | 4/2001 | Lomp et al. | ................ 455/67.1 |

OTHER PUBLICATIONS

3rd Generation Partnership Project; Technical Specification Group Radio Access Network; Physical layer procedures (FDD) (Release 4) 3GPP TS 25.214 V4.1.0 (Jun. 2001) Section 8—p. 41 Idle periods for IPDL location method. (A date of publication more precise than Jun., 2001, is unknown.).

3rd Generation Partnership Project; Technical Specification Group Radio Access Network; Physical layer procedures (FDD) (Release 4) 3GPP TS 25.214 V4.0.0 (Mar. 2001) Section 8—p. 41 Idle periods for IPDL location method. (A date of publication more precise than Mar., 2001, is unknown.).

* cited by examiner

Primary Examiner—Thanh Cong Le
Assistant Examiner—Thuan T. Nguyen
(74) Attorney, Agent, or Firm—Ware, Fressola, Van Der Sluys & Adolphson (57) ABSTRACT

A method for use by a mobile station in a cellular telephone network in determining a setting for gain control for a first idle period in a succession of idle periods of the serving base station, the method including: determining whether at the location of the mobile phone, the load attributable to any one of the neighboring or active set base stations differs substantially from the load attributable to at least one other of the neighboring or active set base stations, the determining being based only on information already available to the mobile station; and determining the gain control setting based on a calculation of the relative power decrease made according to a prescription that depends on whether the load attributable to any one of the neighboring or active set base stations differs from the load attributable to at least one other of the neighboring or active set base stations.

18 Claims, 4 Drawing Sheets

SYSTEM FOR ADJUSTING GAIN OF A MOBILE STATION DURING AN IDLE PERIOD OF THE SERVING BASE STATION

FIELD OF THE INVENTION

The present invention relates to gain control for receivers of mobile stations of a cellular telephone network, and more particularly to adjusting the automatic gain control (AGC) setting of a wideband code division multiple access (WCDMA) mobile station during an idle period of the serving base station in a cellular telephone network supporting the so-called Idle Period Downlink (IPDL) terminal positioning feature.

BACKGROUND OF THE INVENTION

A WCDMA base station can stop transmitting in downlink (a communication from a base station to mobile stations) for a certain period of time; a period in which a base station is not transmitting is called an idle period. Associated with these idle periods is so-called idle period downlink (IPDL) functionality, which is utilized to facilitate mobile station positioning in WCDMA and is specified in more detail in *3GPP specification, TSG-RAN, TS 25.214, section 8*. Idle periods are relatively short in duration and occur at regular intervals. During a succession of idle periods, a mobile station can measure signals transmitted by other, nearby base stations (not the serving base station), and based on such measurements, calculate its position. Each occurrence of an idle period of a base station is signaled to the mobile stations being served by the base station so that the mobile stations can prepare to carry out the position measurements.

Adjusting the automatic gain control (AGC) of a mobile station-during the first idle period in a succession of idle periods can be problematic. If the mobile station is close to the serving base station when the serving base station goes idle for the first time in a series of idle periods in which a position measurement is to be performed, the receiver will have a gain set to such a low value that it will detect hardly any signals from neighboring base stations. In order to receive and measure signals from the neighboring base stations during such an idle period, the AGC must be made to quickly and reliably adjust to an appropriate setting. The prior art teaches having the AGC loop (control procedure) carry out a stepwise random search of the received power, assuming no knowledge of the proper received power (except that the received power has decreased). Such a procedure can be time-consuming.

What is needed is a way to make an initial (during the first idle period of one positioning measurement session covering several idle periods) proper, rough estimate for an appropriate AGC setting. Such an estimate can then be fine-tuned later. The settling of the AGC value on an appropriate setting for other than the first idle period for a positioning measurement is straightforward, since an initial value for the AGC for each subsequent idle period is obtained from the AGC value of the previous idle period.

SUMMARY OF THE INVENTION

Accordingly, the present invention provides a system, apparatus and corresponding method for determining a setting for gain control of a mobile station in a cellular telephone network, the cellular telephone network including a plurality of base stations each having an associated cell, the base stations including the serving base station having the cell in which the, mobile station is temporarily located and also including base stations neighboring the serving base station and base stations on the active set of the mobile station, the method for use in providing a setting of the gain control for a first idle period in a succession of idle periods of the serving base station, the method including the steps of: receiving a signal from the serving base station indicating the beginning of a first idle period of the serving base station; determining whether at the location of the mobile phone the load attributable to any one of the neighboring base stations or the active set base stations differs substantially from the load attributable to at least one other of the neighboring base stations or the active set base stations, the determining being based only on information already available to the mobile station; and determining the gain control setting based on a calculation of the relative power decrease made according to a prescription that depends on whether and by how much the load attributable to any one of the neighboring base stations or the active set base stations differs from the load attributable to at least one other of the neighboring base stations or the active set base stations.

In a further aspect of the invention, if the loads attributable to each of the neighboring and active set base stations are all substantially the same, the relative power decrease is calculated using available information in a load-independent way, and, in addition, the available information includes the average energy per chip received from each neighboring and active set base station common pilot channel and the total received power spectral density including signal and interference.

In another further aspect of the invention, if the loads attributable to each of the neighboring and active set base stations are all substantially the same, the relative power decrease is calculated using, $$D = \frac{G_{IP}s_1 + \sum_{k=2}^{n} E_{c,k}}{\sum_{k=1}^{n} E_{c,k}},$$

where $E_{c,k}$ corresponds to the average energy per chip received from the $k^{th}$ neighboring or active set base station common pilot channel, where $I_0$ is the total received power spectral density including signal and interference, and where $G_{IP}$ is an attenuation factor for the serving base station transmission during the idle period.

In yet another further aspect of the invention, if the loads attributable to each of the neighboring and active set base stations are not all substantially the same, the relative power decrease is calculated using available information but taking into account the variation in the loads attributable to the neighboring and active set base stations, and the available information includes the average energy per chip received from each neighboring and active set base station common pilot channel and the total received power spectral density including signal and interference.

In still yet another further aspect of the invention, if the loads attributable to each of the neighboring and active set base stations are not all substantially the same, the relative power decrease is calculated using, $$D = \frac{G_{IP}w_1s_1 + \sum_{k=2}^{n} w_k s_k}{\sum_{k=1}^{n} w_k s_k},$$

where a value of 1 for the index k indicates the serving base station, and where the $w_k$ are weights proportional to the loads attributable to the neighboring and active set base stations. In some applications implementing this aspect of the invention, the weights are given by $$w_k = \frac{1}{F_k},$$

where $F_k$ is the ratio of the common pilot channel energy to the total transmit energy for the $k^{th}$ neighboring or active set base station.

From another perspective, the invention is a method for determining a setting for gain control of a mobile station in a cellular telephone network, the cellular telephone network including a plurality of base stations each having an associated cell, the base stations including the serving base station having the cell in which the mobile station is temporarily located and also including neighboring base stations, the method for use in providing a setting of the gain control for a first idle period in a succession of idle periods of the serving base station, the method including the steps of: detecting the beginning of a first idle period of the serving base station based on a signal provided by the serving base station; and determining the gain control setting based on a calculation of the relative power decrease calculated according to a prescription that uses only information already available to the mobile station.

From yet another perspective, the invention is a system for determining a setting for gain control of a mobile station in a cellular telephone network, the cellular telephone network including a plurality of base stations each having an associated cell, the base stations including the serving base station having the cell in which the mobile station is temporarily located and also including base stations neighboring the serving base station and base stations on the active set of the mobile station, the method for use in providing a setting of the gain control for a first idle period in a succession of idle periods of the serving base station, the system including the mobile station and a wireless network computational facility in wireless communication with the mobile station. The mobile station includes: means for receiving a signal from the serving base station indicating the beginning of a first idle period of the serving base station; means for determining whether at the location of the mobile phone the load attributable to any one of the neighboring base stations or the active set base stations differs substantially from the load attributable to at least one other of the neighboring base stations or the active set base stations, the determination being based only on information already available to the mobile station; and means for determining the gain control setting based on a calculation of the relative power decrease made according to a prescription that depends on whether and by how much the load attributable to any one of the neighboring base stations or the active set base stations differs from the load attributable to at least one other of the neighboring base stations or the active set base stations. The wireless network computational facility and the mobile station work together in.providing gain control in that the wireless network computational facility assists in the determinations or calculations required to determine the relative power decrease.

Thus, using the invention, the automatic gain control (AGC) settling time of a mobile station of a cellular network can be significantly shortened, making the mobile station positioning measurements that the idle period downlink (IPDL) is facilitating more effective. The invention makes an initial adjustment of the AGC of a mobile station for an idle period based on measurement information available from the serving cell for the mobile station and also based on measurement information from neighboring cells.

The main advantage of the proposed method is that the proper level/setting for the AGC can be found significantly faster than with the prior art method, so that either the total measurement time/settling time can be shorter, or the measurements can be of higher quality for the same integration time. Another advantage is that all the measurement information required for AGC is already available at a mobile station because the information needed for determining an AGC setting according to the invention is also used for other purposes.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
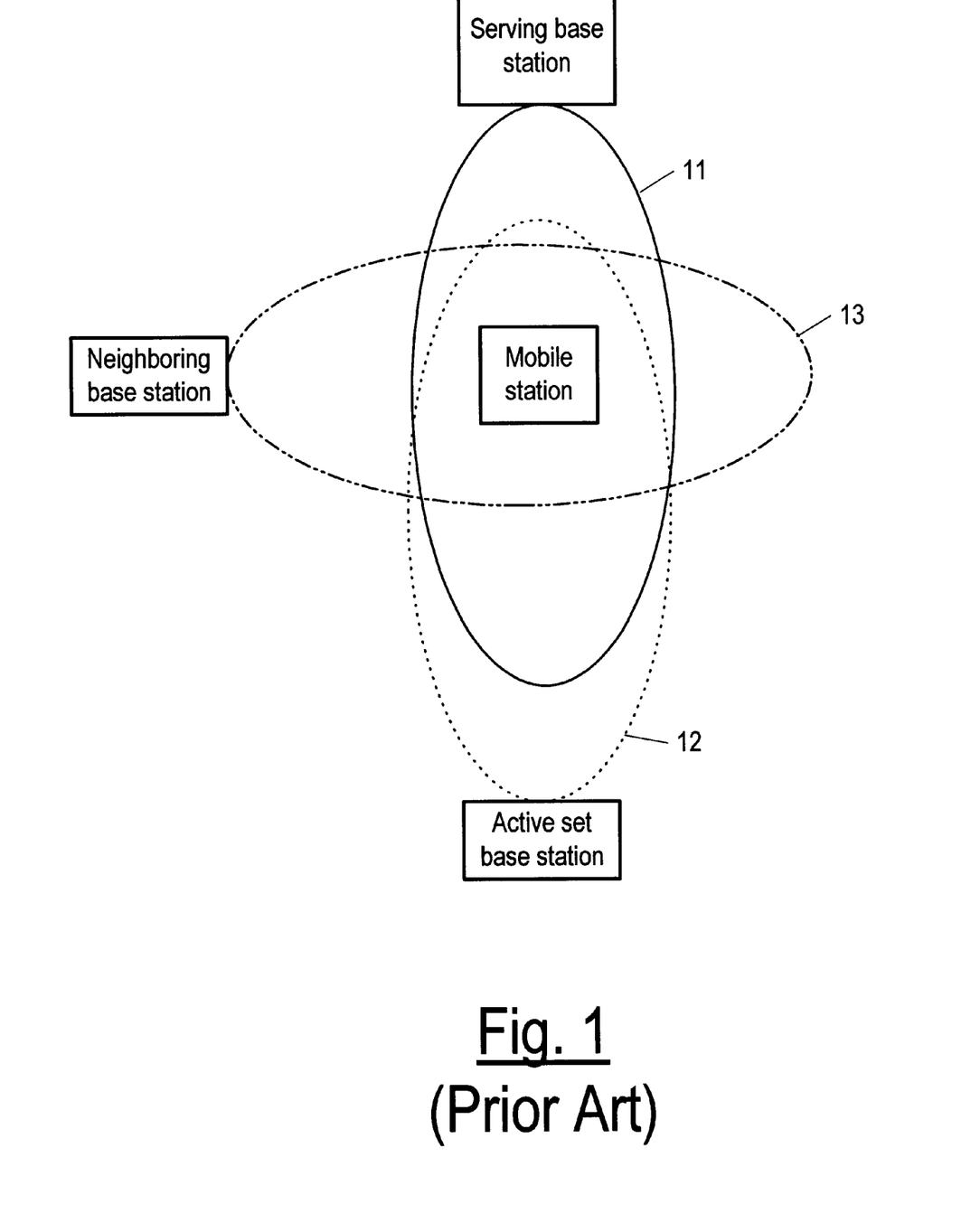
FIG. 1 is a context diagram showing a serving base station and mobile stations/mobile stations being served by the serving base station, and also showing neighboring base stations, whose signals are being used by a mobile station to determine the position of the mobile station during an idle period downlink of the serving base station.

Referring now to FIG. 1, a serving base station is shown providing service to a mobile station located in a cell 11 of the serving base station. At the same time, a time when idle period downlink (IPDL) functionality is being used, the mobile station is located in the coverage areas 12 and 13 of two neighboring base stations. The mobile station can determine its position by measuring signals from all three of the base stations, the signal from the serving base station at any time other than an idle period and the signals from the neighboring base stations, but to measure the signals of the neighboring base stations during the idle period, the gain of the receiver of the mobile station must be adjusted from its value during normal operation of the serving base station. The basis for adjusting the gain of the mobile station in such a situation is provided by the invention.

Figure 2:
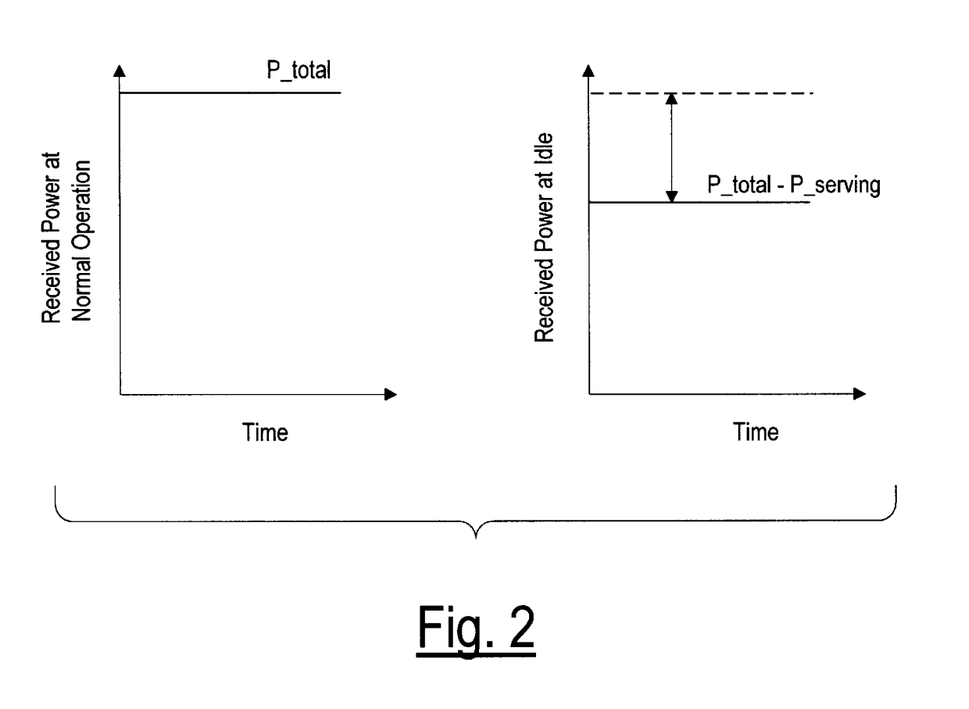
FIG. 2 is a set of two graphs, the left-hand graph indicating the power received by a mobile station as a function of time during normal operation of the serving base station, and the right-hand graph indicating the received power during an idle period.

Referring now to FIG. 2, the decrease in power received by a mobile station when the serving base station enters an idle interval in its duty cycle is illustrated, a decrease that is compensated for by the invention, as described above. The left-hand graph indicates the power received by a mobile station as a function of time during normal operation of the serving base station, and the right-hand graph indicating the received power during an idle period. The decrease in received power during an idle period indicated by the right-hand graph (a decrease by an amount indicated as P_serving), is compensated for by the invention by adjusting the automatic gain control of the receiver of the mobile station, in order for the receiver of the mobile station to carry out measurements involving signals provided by neighboring base stations.

According to the invention, a WCDMA mobile station (cellular base station) measures the signal level of the base stations that are on its neighbor list (a list, used in a handover procedure, consisting of those base stations that happen to be nearby), and then, based on the signal level measurements and based on the knowledge of the signal level of the serving base station, which will cycle through a succession of idle periods, the mobile station estimates how much the total received signal power will drop during an idle period of the serving base station. (The timings of idle periods in neighboring base stations must be selected so that they will not overlap in time either with each other or with the serving base station.) The accuracy of the estimate depends on various factors, including the accuracy of the signal level measurements and signal fluctuations due to slow and fast fading.

In the following description, it is assumed that a mobile station (i.e. the receiver component of a mobile station) has measured the signal-to-interference ratios (SIR) for each base station in its active set and neighbor list. The SIR is given by, $$SIR = E_{c,k}/I_0 \quad (1)$$

where $E_{c,k}$ (having dimensions of power times time, which equates to energy) is the average energy per chip received from the $k^{th}$ base station's common pilot channel, and $I_0$ is the total received power spectral density (having dimensions of power per unit frequency, which also equates to energy) including both signal and interference (noise) power. The invention assumes that the interference statistics are dominated by the transmitted power of base stations that are in the active set and in the neighbor list. (The active set of base stations for a mobile station are all base stations with which the mobile station currently has a connection. Due to so-called soft handover in CDMA systems, a mobile station can be connected to several base stations simultaneously.) The embodiment of the invention described here also assumes that the effect of background noise is negligible, i.e. it is assumed that the measurement is interference-dominated.

Denoting by $S_k$ the SIR values according to a linear scale (as opposed to a logarithmic scale), an estimate according to the invention for the relative power decrease D during the idle period downlink of the serving base station (whose index is here taken to be 1) is given by, $$D = \frac{G_{IP}s_1 + \sum_{k=2}^{n} s_k}{\sum_{k=1}^{n} s_k} = \frac{G_{IP}E_{c,1}/I_0 + \sum_{k=2}^{n} E_{c,k}/I_0}{\sum_{k=1}^{n} E_{c,k}/I_0} = \frac{G_{IP}E_{c,1} + \sum_{k=2}^{n} E_{c,k}}{\sum_{k=1}^{n} E_{c,k}}, \quad (2)$$

where $G_{IP}$ is the attenuation factor (according to the same linear scale) for the (serving) base station transmission during the idle period. (Ideally, $G_{IP}=0$, corresponding to infinitely high attenuation.) Equation (2) depends only on the received common pilot channel energy of those base stations that can be measured (by measuring power received over a predetermined period of time). (Common pilot channel energy refers to the received energy on the common pilot channel of each base station of interest.) It is sufficient to account for only the common pilot channel energy if it is true that the transmit load ratio attributable to each of the different (neighbor list and active set) base stations is approximately the same (i.e. substantially the same, or in other words, not meaningfully different), the terminology transmit load ratio being used to indicate the ratio of the common pilot channel transmit power to the total transmit power of the base station. (The pilot channel's transmit power is held constant, but the total transmit power of a base station depends for example on the number of active users, their data rates, how far the users are from the base station, and other factors. When calculating the relative power decrease D, it is not the measured base station's pilot channel energy that is of interest, but the total received energy from the measured base station. Unfortunately, a mobile station cannot measure the total received energy. However, if the transmit load ratios, as defined above, for the measured base stations (the active set and neighbor list base stations) are all the same, then so will be the ratios of total received energy from each measured base station. When the transmit load ratios attributable to different (active set or neighboring) base stations are different (any one being different from any other), an adjustment as per the present invention is, preferably, made so as not to emphasize too much the effect of lightly loaded cells (i.e. the effect of a light load, at the location of the mobile phone, attributable to a neighboring base station.)

If the load attributable to different (active set or neighboring) base stations (the load attributable to the serving base station being negligible during an idle period) varies (at least one being different from at least one other) because for example the number of users being served by the different neighboring base stations is different, and if the knowledge of the load (meaning the transmit load ratio as defined above) is available to the receiver, a weighted version of equation (2) is, preferably, used to provide the relative power decrease D as, $$D = \frac{G_{IP}w_1 s_1 + \sum_{k=2}^{n} w_k s_k}{\sum_{k=1}^{n} w_k s_k}, \quad (3)$$

where $w_k$ are weights proportional in some way to the load of the cell in question (the cell for which the load is being measured) for the different base stations, including the serving base station (for which k=1). More specifically, the weights are taken so that the smaller the load on the cell by a given base station, the smaller the weight for the base station. In the preferred embodiment, the weights are given by, $$w_k = \frac{1}{F_k}, \quad (4)$$

where $F_k$ is the ratio of the common pilot channel energy to the total transmit energy for the $k^{th}$ base station. The total received chip energy of each base station is then estimated using these weights (the weights given by equation (4)) when calculating the relative power decrease D.

Figure 3:
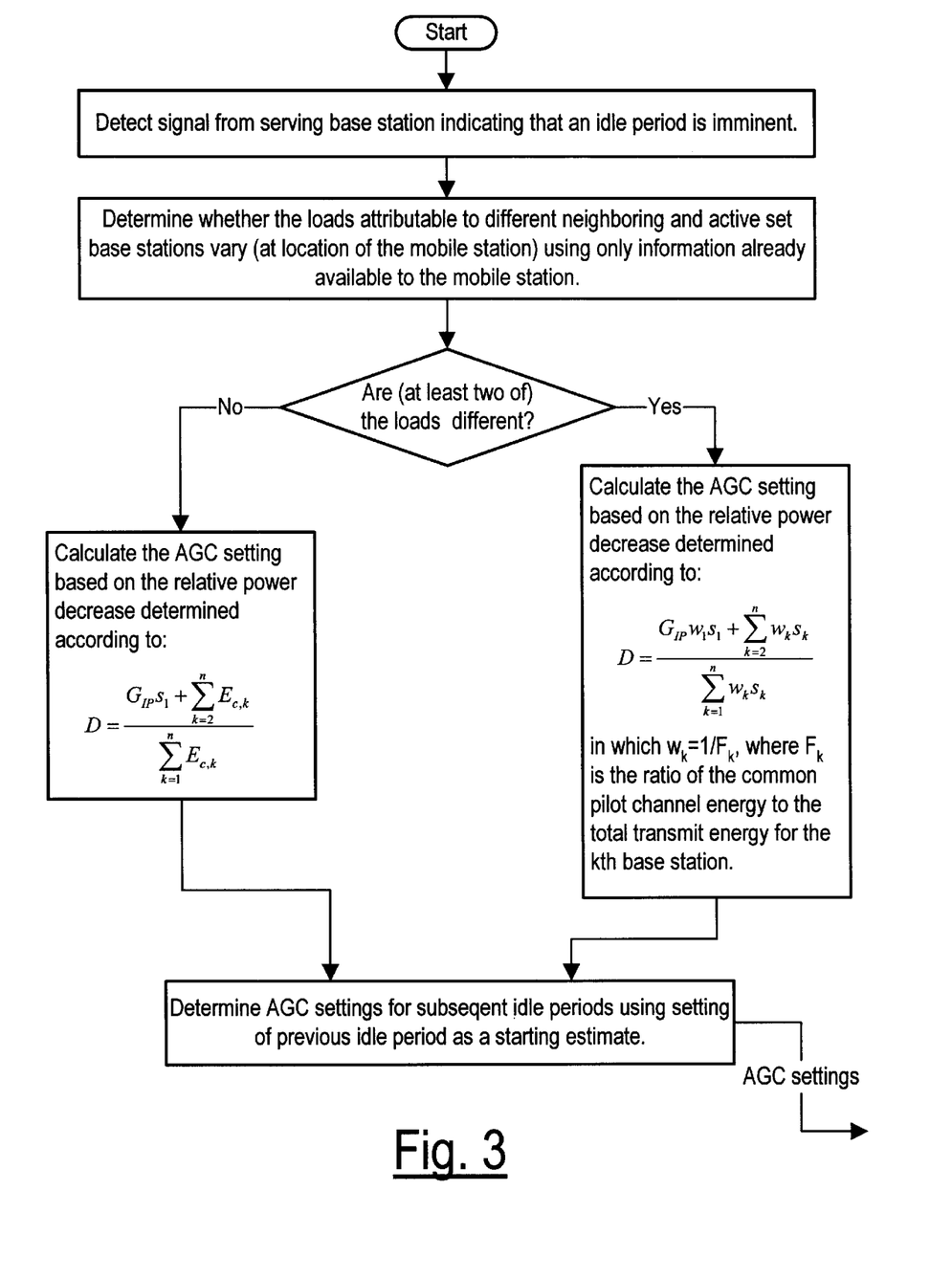
FIG. 3 is a flow chart for a method, according to the invention, for determining an initial value of the automatic gain control (AGC) value for a mobile station, i.e. the value to be used during a first idle period downlink of the serving base station.

Referring now to FIG. 3, according to the invention, a mobile station initially determines its AGC setting for a position measurement before the first idle period during which the position measurement is to be made using IPDL, by calculating the relative power decrease D using, preferably, equation (2) or (3) (using equation (3) if the load at the location of the mobile phone attributable to at least one of the different (neighboring or active set) base stations is not the same as for at least some other, and knowledge of the load for each is available, and otherwise using equation (2)), based on the information available to the mobile station, such as signal level measurement results, traffic loads in different cells, and base station transmission attenuation factors during idle period downlink. (The timing of the initial determination is based on the mobile station detecting a signal (conveyed on a control channel) indicating that an idle period is imminent; there is no "IPDL signal" per se to be detected. The initial AGC setting, to be used for the first idle period in the positioning measurement session, is then set according to the parameter D or some quantized representation of it. Further fine tuning for the correct AGC setting is carried out if necessary.

The accuracy of the power decrease indicated by D depends on several factors, including: the accuracy of the signal level measurements; the traffic load in the cells; the fraction of the common pilot channel energy compared to the total transmit energy for a cell; whether or not a cell has a light traffic load (since in light traffic loads, neglecting background noise can bias the results); and fluctuations due to slow and fast fading.

Figure 4:
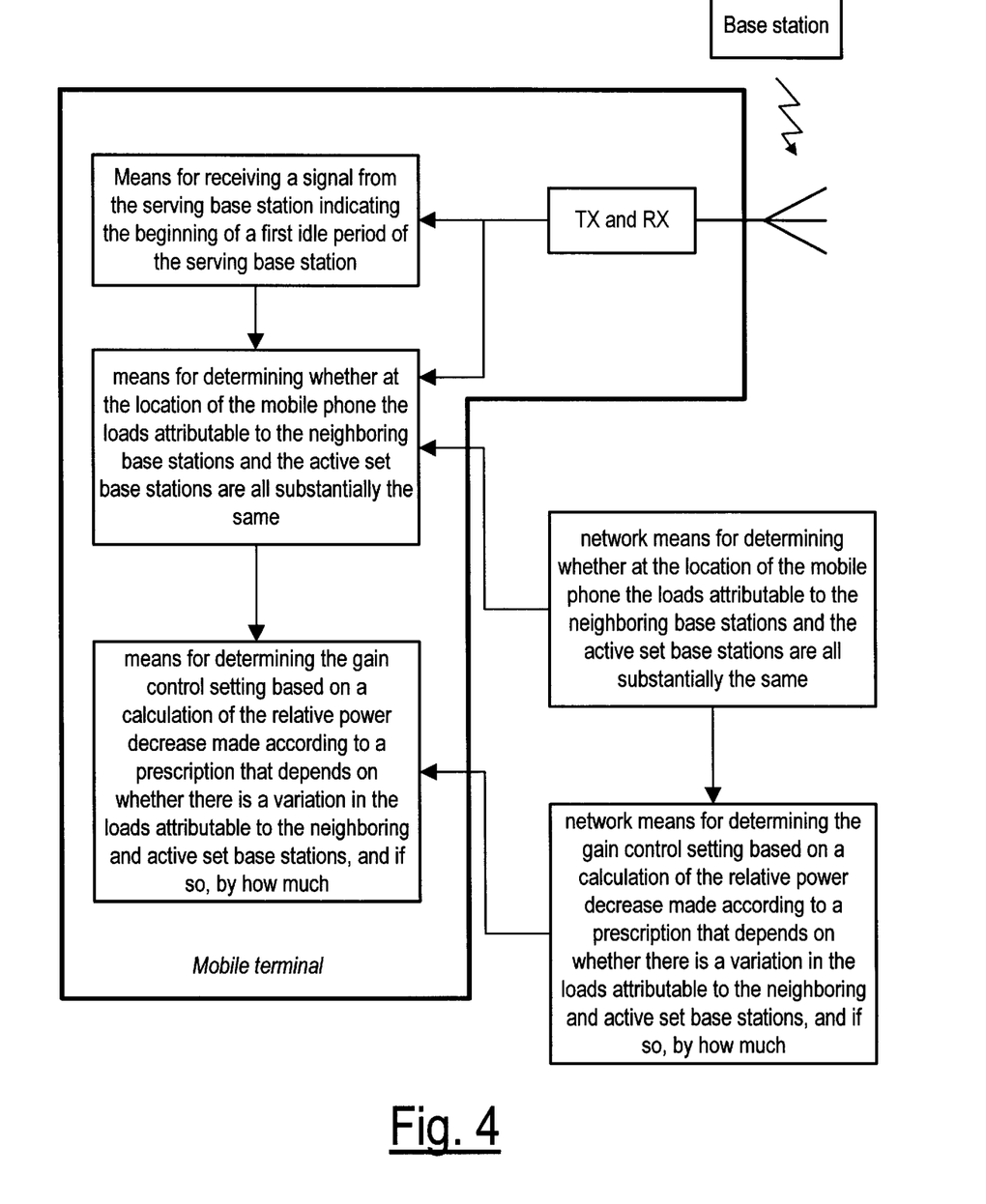
FIG. 4 is a block diagram of a system according to the invention.

Referring now to FIG. 4, a system according to the invention is shown as including various components housed in a mobile terminal as well as, in some embodiments, some components provided as part of a cellular network. According to the invention, besides its usual components, a mobile terminal includes: means for receiving a signal from the serving base station indicating the beginning of a first idle period of the serving base station; means for determining whether at the location of the mobile phone the loads attributable to the neighboring base stations and the active set base stations are all substantially the same; and means for determining the gain control setting based on a calculation of the relative power decrease made according to a prescription that depends on whether there is a variation in the loads attributable to the neighboring and active set base stations, and if so, by how much. As indicated in FIG. 4, some of the calculations performed according to the invention may, in some embodiments, be performed in whole or in part by facilities provided as part of a wireless network in wireless communication with the mobile terminal. As shown in FIG. 4, in some embodiments, a wireless network could perform or assist in performing the work of the means for determining whether the loads are substantially all the same and the means for determining the gain control. (For clarity in showing the cooperation of the corresponding elements of network and mobile terminal in such embodiments, a direct communication between a network component and the corresponding mobile telephone component is shown in FIG. 4, although such communication would of course actually occur through the transmitter (TX) and receiver (RX) systems of the mobile terminal.)

SCOPE OF THE INVENTION

It is to be understood that the above-described arrangements are only illustrative of the application of the principles of the present invention. In particular, it is to be understood that the invention is not restricted to the specific prescriptions set out in equations (2) and (3) for the relative power decrease D and equation (4) for the weights $w_k$; the invention should instead be understood to encompass any formulation for the relative power decrease D and weights $w_k$ in qualitative agreement with the formulations disclosed here as the best mode, i.e. any formulation in which the relative power decrease D and weights $w_k$ vary with the indicated parameters (independent variables) in generally the same way as in the best mode (i.e. increasing with increasing values of a parameter if the relative power decrease D and weights $w_k$ increase with an increasing value of the parameter in the preferred embodiment). Numerous modifications and alternative arrangements may be devised by those skilled in the art without departing from the spirit and scope of the present invention, and the appended claims are intended to cover such modifications and arrangements.

What is claimed is:

1. A method for determining a setting for gain control of a mobile station in a cellular telephone network, the cellular telephone network including a plurality of base stations each having an associated cell, the base stations including the serving base station having the cell in which the mobile station is temporarily located and also including base stations neighboring the serving base station and base stations on the active set of the mobile station, the method for use in providing a setting of the gain control for a first idle period in a succession of idle periods of the serving base station, the method comprising the steps of:
   a) receiving a signal from the serving base station indicating the beginning of a first idle period of the serving base station;
   b) determining whether at the location of the mobile phone the load attributable to any one of the neighboring base stations or the active set base stations differs substantially from the load attributable to at least one other of the neighboring base stations or the active set base stations, the determining being based only on information already available to the mobile station; and
   c) determining the gain control setting based on a calculation of the relative power decrease made according to a prescription that depends on whether and by how much the load attributable to any one of the neighboring base stations or the active set base stations differs from the load attributable to at least one other of the neighboring base stations or the active set base stations.

2. The method of claim 1, wherein if the loads attributable to each of the neighboring and active set base stations are all substantially the same, the relative power decrease is calculated using available information in a load-independent way, wherein the available information includes the average energy per chip received from each neighboring and active set base station common pilot channel and the total received power spectral density including signal and interference.

3. The method of claim 1, wherein if the loads attributable to each of the neighboring and active set base stations are all substantially the same, the relative power decrease is calculated using, $$D = \frac{G_{IP}S_1 + \sum_{k=2}^{n} E_{c,k}}{\sum_{k=1}^{n} E_{c,k}},$$

where $E_{c,k}$ corresponds to the average energy per chip received from the $k^{th}$ neighboring or active set base station common pilot channel, where $I_0$ is the total received power spectral density including signal and interference, and where $G_{IP}$ is an attenuation factor for the serving base station transmission during the idle period.

4. The method of claim 1, wherein if the loads attributable to each of the neighboring and active set base stations are not all substantially the same, the relative power decrease is calculated using available information but taking into account the variation in the loads attributable to the neighboring and active set base stations, wherein the available information includes the average energy per chip received from each neighboring and active set base station common pilot channel and the total received power spectral density including signal and interference.

5. The method of claim 4, wherein the variations in the loads attributable to the neighboring and active set base stations are taken into account using weights that depend inversely on the ratio of the common pilot channel energy to the total transmit energy for each base station.

6. The method of claim 1, wherein if the loads attributable to each of the neighboring and active set base stations are not all substantially the same, the relative power decrease is calculated using, $$D = \frac{G_{IP}w_1 s_1 + \sum_{k=2}^{n} w_k s_k}{\sum_{k=1}^{n} w_k s_k},$$

where a value of 1 for the index k indicates the serving base station, and where the $w_k$ are weights proportional to the loads attributable to the neighboring and active set base stations.

7. The method of claim 6, wherein the weights are given by $$w_k = \frac{1}{F_k},$$

where $F_k$ is the ratio of the common pilot channel energy to the total transmit energy for the $k^{th}$ neighboring or active set base station.

8. A method for determining a setting for gain control of a mobile station in a cellular telephone network, the cellular telephone network including a plurality of base stations each having an associated cell, the base stations including the serving base station having the cell in which the mobile station is temporarily located and also including neighboring base stations, the method for use in providing a setting of the gain control for a first idle period in a succession of idle periods of the serving base station, the method comprising the steps of:
  a) detecting the beginning of a first idle period of the serving base station based on a signal provided by the serving base station;
  b) determining the gain control setting based on a calculation of the relative power decrease calculated according to a prescription that uses only information already available to the mobile station.

9. An apparatus for determining a setting for gain control of a mobile station in a cellular telephone network, the cellular telephone network including a plurality of base stations each having an associated cell, the base stations including the serving base station having the cell in which the mobile station is temporarily located and also including base stations neighboring the serving base station and base stations on the active set of the mobile station, the method for use in providing a setting of the gain control for a first idle period in a succession of idle periods of the serving base station, the apparatus comprising:
  a) means for receiving a signal from the serving base station indicating the beginning of a first idle period of the serving base station;
  b) means for determining whether at the location of the mobile phone the load attributable to any one of the neighboring base stations or the active set base stations differs substantially from the load attributable to at least one other of the neighboring base stations or the active set base stations, the determination being based only on information already available to the mobile station; and
  c) means for determining the gain control setting based on a calculation of the relative power decrease made according to a prescription that depends on whether and by how much the load attributable to any one of the neighboring base stations or the active set base stations differs from the load attributable to at least one other of the neighboring base stations or the active set base stations.

10. The apparatus of claim 9, wherein if the loads attributable to each of the neighboring and active set base stations are all substantially the same, the means for determining the gain control setting calculates the relative power decrease using available information in a load-independent way, wherein the available information includes the average energy per chip received from each neighboring and active set base station common pilot channel and the total received power spectral density including signal and interference.

11. The apparatus of claim 9, wherein if the loads attributable to each of the neighboring and active set base stations are all substantially the same, the means for determining the gain control setting calculates the relative power decrease using, $$D = \frac{G_{IP}s_1 + \sum_{k=2}^{n} E_{c,k}}{\sum_{k=1}^{n} E_{c,k}},$$

where $E_{c,k}$ corresponds to the average energy per chip received from the $k^{th}$ neighboring or active set base station common pilot channel, where $I_0$ is the total received power spectral density including signal and interference, and where $G_{IP}$ is an attenuation factor for the serving base station transmission during the idle period.

12. The apparatus of claim 9, wherein if the loads attributable to each of the neighboring and active set base stations are not all substantially the same, the means for determining the gain control setting calculates the relative power decrease using available information but taking into account the variation in the loads attributable to the neighboring and active set base stations, wherein the available information includes the average energy per chip received from each neighboring and active set base station common pilot channel and the total received power to spectral density including signal and interference.

13. The apparatus of claim 12, wherein the variations in the loads attributable to the neighboring and active set base stations are taken into account using weights that depend inversely on the ratio of the common pilot channel energy to the total transmit energy f-or each base station.

14. The apparatus of claim 9, wherein if the loads attributable to each of the neighboring and active set base stations are not all substantially the same, the means for determining the gain control setting calculates the relative power decrease using, $$D = \frac{G_{IP} w_1 s_1 + \sum_{k=2}^{n} w_k s_k}{\sum_{k=1}^{n} w_k s_k},$$

where a value of 1 for the index k indicates the serving base station, and where the $w_k$ are weights proportional to the loads attributable to the neighboring and active set base stations.

15. The apparatus of claim 14, wherein the weights are given by $$w_k = \frac{1}{F_k},$$

where $F_k$ is the ratio of the common pilot channel energy to the total transmit energy for the $k^{th}$ neighboring or active set base station.

16. An apparatus for determining a setting for gain control of a mobile station in a cellular telephone network, the cellular telephone network including a plurality of base stations each having an associated cell, the base stations including the serving base station having the cell in which the mobile station is temporarily located and also including neighboring base stations, the method for use in providing a setting of the gain control for a first idle period in a succession of idle periods of the serving base station, the apparatus comprising:

a) means for detecting the beginning of a first idle period of the serving base station based on a signal provided by the serving base station; and b) means for determining the gain control setting based on a calculation of the relative power decrease calculated according to a prescription that uses only information already available to the mobile station.

17. A system for determining a setting for gain control of a mobile station in a cellular telephone network, the cellular telephone network including a plurality of base stations each having an associated cell, the base stations including the serving base station having the cell in which the mobile station is temporarily located and also including base stations neighboring the serving base station and base stations on the active set of the mobile station, the method for use in providing a setting of the gain control for a first idle period in a succession of idle periods of the serving base station, the system comprising the mobile station, which in turn comprises:

a) means for receiving a signal from the serving base station indicating the beginning of a first idle period of the serving base station;

b) means for determining whether at the location of the mobile phone the load attributable to any one of the neighboring base stations or the active set base stations differs substantially from the load attributable to at least one other of the neighboring base stations or the active set base stations, the determination being based only on information already available to the mobile station; and c) means for determining the gain control setting based on a calculation of the relative power decrease made according to a prescription that depends on whether and by how much the load attributable to any one of the neighboring base stations or the active set base stations differs from the load attributable to at least one other of the neighboring base stations or the active set base stations;

the system further comprising a wireless network computational facility in wireless communication with the mobile station, wherein the wireless network computational facility assists in the determinations or calculations required to determine the relative power decrease.

18. A system as in claim 17, further comprising a base station able to communicate with the mobile station.

* * * * *

UNITED STATES PATENT AND TRADEMARK OFFICE
CERTIFICATE OF CORRECTION

PATENT NO.    : 6,580,920 B2
DATED         : June 17, 2003
INVENTOR(S)   : Kari Kalliojarvi It is certified that error appears in the above-identified patent and that said Letters Patent is hereby corrected as shown below:

Column 1,
Line 36, "station-during" should be -- station during --.

Column 2,
Line 2, "which the, mobile station" should be -- which the mobile station --.

Column 3,
Line 66, "together in.providing gain" should be -- together in providing gain --.

Column 10,
Line 64, "energy f-or each" should be -- energy for each --.

Signed and Sealed this

Ninth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,580,920 B2
APPLICATION NO. : 09/874912
DATED : June 17, 2003
INVENTOR(S) : Kari Kalliojarvi It is certified that error appears in the above-identified patent and that said Letters Patent is hereby corrected as shown below:

In column 2, line 42, replace " $D = \dfrac{G_{lP}s_1 + \sum_{k=2}^{n} E_{c,k}}{\sum_{k=1}^{n} E_{c,k}}$ " with -- $D = \dfrac{G_{lP}E_{c,1} + \sum_{k=2}^{n} E_{t,k}}{\sum_{k=1}^{n} E_{c,k}}$ --.

In column 8, line 61, claim 3, line 5, make the same change as in 1.

In column 9, line 67, claim 9, line 8, delete "method" and substitute therefor --apparatus--.

In column 10, line 39, claim 11, line 6, make the same change as in 1.

In column 12, claim 17, line 6, delete "method" and substitute therefor --system--.

In Fig. 3, make the same change as in 1.

At column 2, line 49, the text "where $I_0$ is the total received power spectral density including signal and interference," should be deleted.

At column 8, line 67, claim 3, line 8, make the same change as in 7.

UNITED STATES PATENT AND TRADEMARK OFFICE
CERTIFICATE OF CORRECTION

PATENT NO. : 6,580,920 B2
APPLICATION NO. : 09/874912
DATED : June 17, 2003
INVENTOR(S) : Kari Kalliojarvi It is certified that error appears in the above-identified patent and that said Letters Patent is hereby corrected as shown below:

At column 10, line 45, claim 11, line 9, make the same change as in 7.

Signed and Sealed this

First Day of May, 2007

JON W. DUDAS
*Director of the United States Patent and Trademark Office*